Patented Dec. 15, 1931

1,836,711

UNITED STATES PATENT OFFICE

HARRY LE B. GRAY, OF ROCHESTER, NEW YORK, ASSIGNOR TO EASTMAN KODAK COMPANY, OF ROCHESTER, NEW YORK, A CORPORATION OF NEW YORK

PROCESS OF MAKING ACETYLATING MIXTURES

No Drawing. Application filed April 24, 1928. Serial No. 272,567.

This invention relates to processes of making acetylating mixtures, especially those containing acetic anhydrid and glacial acetic acid. One object of the invention is to provide a relatively simple and direct process for producing such a mixture substantially free from chlorids. Another object is to provide a process of making acetic anhydrid, in which the reaction of acetyl chlorid on sodium acetate (or other equivalent metallic acetate) is so controlled that the acetic anhydrid thus produced, when distilled from the reaction mass, will be free from acetyl chlorid or other chlorids,—thus making unnecessary any subsequent purification from chlorids. Other objects will hereinafter appear.

When acetic anhydrid is produced in the known way by reacting with acetyl chlorid on anhydrous sodium acetate and distilling off the product, the latter is contaminated with uncombined acetyl chlorid which requires subsequent operations for its removal. See pages 118 and 119 in "Die Praxis des Organischen Chemickers" by Ludwig Gattermann, published at Leipzig, Germany, 1898 (3rd edition) by Veit and Company. In acetylation reactions, such as are used in the manufacture of cellulose acetate, there are used reaction mixtures containing acetic anhydrid, glacial acetic acid and a catalyst. Such a mixture should be substantially free from acetyl chlorid because, among other objections, it harmfully reacts on one or more of the other ingredients or the product. It is, therefore, desirable to modify the reaction of actetyl chlorid on sodium acetate in such a way as to produce a mixture of acetic anhydrid with glacial acetic acid substantially free from acetyl chlorid without using any subsequent de-chloridizing steps.

I have found that such desirable results can be obtained by conducting the acetyl chlorid-sodium acetate reaction in the presence of glacial acetic acid and then distilling off glacial acetic acid with the acetic anhydrid produced by the reaction. Under these conditions, the reaction proceeds to such completion that no chlorids are left that are sufficiently volatile to distill over into said mixture. In the preferred embodiment of my invention I use an amount of glacial acetic acid weighing from about 25% of the weight of the acetyl chlorid upwards, depending upon the proportion of glacial acetic acid desired in the distillate which is to be used as an acetylating mixture. There is at least enough sodium acetate used to react with all of the acetyl chlorid and preferably there is a slight excess.

I shall now describe one illustrative way of carrying out my invention, but it will be understood that the latter is not limited to the details thus given, except as indicated in the appended claims. 150 parts by weight of fused anhydrous sodium acetate are placed in any suitable reaction vessel having resisting walls. There is then run into the same vessel, and mixed with the sodium acetate, 40 parts by weight of glacial acetic acid (99.5–100.0%). The vessel is then connected with a reflux condenser and acetyl chlorid, say between 95% and 100% strength is slowly introduced into the vessel and brought in reactive contact with the sodium acetate in the presence of the glacial acetic acid. The rate at which it is introduced is determined by the rise in temperature, the latter being kept below 70° to 100° C. 142 parts by weight are thus slowly introduced with agitation, at intervals, and usually the temperature will keep within the above limits if this slow addition of the acetyl chlorid lasts about an hour. The approximate proportion of the above ingredients is as follows: sodium acetate 2 mols, glacial acetic acid ⅔ mol, acetyl chloride 2 mols.

The reaction vessel is then allowed to cool down toward room temperature and then is heated gently for one-half hour at 50° to 60° C. The vessel is then connected to a condenser and is heated by means of an oil bath or other means of gently and uniformly heating the contents of the vessel to the distillation temperature. This prevents too much frothing or violent local action which may carry over liquid material into the condenser and contaminate the distillate. The latter is composed of acetic anhydrid mixed with glacial acetic acid suitable for acetylation reactions, such as in the manufacture of cellulose acetate. The distillate is substantially free from chlorids, as indicated by the known test reactions with sliver salts.

When the glacial acetic acid is less than about one-fourth of the weight of the acetyl chlorid, there is a tendency for chlorid impurities to appear in the distillate. I, therefore, prefer to use more than 25% of glacial acetic acid, based upon the weight of acetyl chlorid, the upper limit of glacial acetic acid being determined solely by the amount which it is desired to have present in the acetylating mixture.

For example, the amount of glacial acetic acid in the reaction mixture may be so chosen that the ultimate distillate will contain 30% of acetic anhydrid and 70% of glacial acetic acid.

While the above process does not give a 100% yield of the acetic anhydrid which is theoretically possible, it does give commercially useful yields, usually much better than 80%. Anhydrous sodium acetate is best, but anhydrous acetates of the other alkali metals, such as potassium acetate, may be employed. Nevertheless, the sodium acetate is much preferred.

Having thus described my invention, what I claim as new and desire to secure by Letters Patent is:

1. The process which comprises the step of reacting with acetyl chlorid on at least a stoichiometrical proportion of anhydrous acetate of an alkali metal in the presence of glacial acetic acid to form acetic anhydrid, there being present in the completed reaction mixture no chloride sufficiently volatile to distill over with the acetic anhydride.

2. The process which comprises reacting with 100 parts of acetyl chlorid on at least a stoichiometrical proportion of anhydrous sodium acetate in the presence of at least 25 parts of glacial acetic acid until said acetyl chlorid is substantially all converted into acetic anhydrid and non-volatile chloride, the acetic anhydrid and glacial acetic acid then being distilled from the reaction mixture and condensed.

3. The process of making acetylating mixtures substantially free from chlorids, which comprises, slowly bringing acetyl chlorid into reaction with an excess of anhydrous sodium acetate mixed with an amount of glacial acetic acid greater than one-fourth the weight of said acetyl chlorid, the reaction being conducted under reflux conditions and completed by heating below 100° C., acetic anhydrid and glacial acetic acid then being distilled off and condensed.

Signed at Rochester, New York, this 18th day of April 1928.

HARRY LE B. GRAY.